United States Patent
Hall et al.

[11] 3,852,571
[45] Dec. 3, 1974

[54] SYSTEM OF TRANSFERRAL OF FUNDS

[75] Inventors: Bruce Wood Hall, Syosset; Michael J. Shade, Coram, both of N.Y.

[73] Assignee: Hempstead Bank, Hempstead, N.Y.

[22] Filed: Aug. 16, 1972

[21] Appl. No.: 280,984

Related U.S. Application Data

[63] Continuation of Ser. No. 38,173, May 18, 1970.

[52] U.S. Cl. 235/61.7 B, 235/61.9 A, 235/61.11 D, 200/46 R, 340/149 A
[51] Int. Cl...... G06k 15/18, G06k 7/08, G06k 7/00
[58] Field of Search..... 235/61.7 B, 61.9 R, 61.9 A, 235/61.11 D, 61.7 R; 197/19; 178/3, 4; 340/152, 149 A; 200/46 R

[56] References Cited
UNITED STATES PATENTS

| | | | | |
|---|---|---|---|---|
| 2,018,420 | 10/1935 | Robinson | | 178/3 |
| 2,980,758 | 4/1967 | Goldwater | | 178/4 |
| 3,035,764 | 5/1962 | Beman | | 235/61.9 A |
| 3,121,159 | 2/1964 | Rogal | | 235/61.9 R |
| 3,340,985 | 9/1967 | Sinila | | 197/19 |
| 3,375,500 | 3/1968 | Fowler | | 340/172.5 |
| 3,427,440 | 2/1969 | Ruscher | | 235/61.9 R |
| 3,513,298 | 5/1970 | Riddle | | 235/61.11 D |
| 3,559,175 | 1/1971 | Pomeroy | | 340/152 |
| 3,611,293 | 10/1971 | Constable | | 235/61.7 B |

*Primary Examiner*—Daryl W. Cook
*Assistant Examiner*—Robert M. Kilgore
*Attorney, Agent, or Firm*—Woodcock, Washburn, Kurtz & Mackiewicz

[57] ABSTRACT

A system for transferring funds between a customer's account and a transferee's account includes input output terminals and a digital computer at a central location. Retail merchants have input output terminals at each point of sale. These terminals include a card reader for encoding identifying indicia from the customer's identification card. The amount of sale is encoded by a keyboard. At the central location the available balance which can be drawn against each customer's account and the accumulated credit for the merchant's account are stored and continuously updated. A communication link transmits the encoded identifying indicia and the amount of sale from each input output terminal to the central location. A digital computer at the central location debits the amount of sale against the customer's available balance and credits the amount of sale to the merchant's accumulated credit. A signal signifying completion of sale, or indicating no sale if the amount exceeds the customer's available balance, is transmitted to the point of sale. A verifier unit at each input output terminal has a keyboard for entering an identification code known only to the customer. Comparison of the code entered by the keyboard with an invisible code on the identification card verifies the identity of the customer. Separation of the verifier from the card reader insures security of the identification procedure.

8 Claims, 4 Drawing Figures

SYSTEM OF TRANSFERRAL OF FUNDS

This is a continuation of application Ser. No. 38,173, filed May 18, 1970.

BACKGROUND OF THE INVENTION

This invention relates to funds transfer systems and more particularly to a system for transferring funds between customers' accounts and transferees' accounts for completion of a monetary transaction.

In general, the settlement of accounts between creditors and debtors falls into four broad categories. These are the exchange of legal tender, payment by check, charge accounts and credit cards.

Consider first the many steps involved when the exchange of legal tender is used to settle accounts. First, an employer paying wages in cash presents a total payroll check to the bank and requests payroll makeup. The bank interrogates the employer's account and if sufficient, places a "hold" on the account. The bank fills a pay envelope with the proper amount of legal tender for each employee. The employee collects the envelopes from the bank and distributes one to each employee. Each employee signs a receipt and hands same to the employer and the employer files receipts in employees' files. The employer's bookkeeper adjusts payroll records.

The employee takes cash for a purchase to a merchant who counts the cash and puts it in the cash register. The merchant counbs the cash and prepares a deposit ticket. The merchant carries the cash and deposit ticket to the bank where a bank teller counts the cash and prints a receipt for the merchant who enters the deposit amount in a checkbook.

The bank teller counts the cash at the end of the day and "balances." The bank processes the deposit ticket and "vaults" the cash. The merchant, at the end of the month, pays the bank a fee for handling of deposits.

A bank depositer wishing to make purchases or settle accounts in cash fills out a check and stub and presents the check to the bank teller. The teller interrogates the computer as to the depositer's balance. The teller counts and recounts the cash, and creates a "ticket" to balance cash. The teller hands cash to the depositor. The bank processes the check. The depositor hands cash to the merchant for purchase who takes the steps already enumerated to have the cash credited to his account.

The settlement of accounts by check involves almost as many steps. Many purchasers are made upon the basis of the presentation of and acceptance of a paper check or bank draft. The following procedures are followed, in the alternate, depending upon the check's being "good" or "bad." The bank depositor fills out check and stub and presents the check to the merchant who demands identification. The depositor supplies identification which is noted by the merchant on the check. The merchant lists the check on a deposit ticket. The merchant hands the deposit ticket and check to the teller at the bank. The merchant enters the bank receipt in his checkbook. The bank processes the deposit ticket and check. The merchant waits several days for use of the funds. However, if the check is returned to the merchant because of insufficient funds, no account, or forgery, the merchant must endeavor to find the purchaser, initiate collection procedures, or write off the bad debt.

Charge accounts involve the following procedures. The purchaser instructs the merchant to charge the purchaser's account. The merchant sets up an account receivable. The merchant prepares and mails a statement of account at least 15 days after purchase. The purchaser mails a check to the merchant, at least 30 days after purchase. The merchant prepares a deposit ticket and presents the deposit ticket and check to the bank. The bank processes the deposit ticket and check. The merchant credits the account receivable ledger. If the bank returns the check to the merchant, then the collection procedure previously mentioned must be initiated.

Settlement of debts by credit cards involves the following procedures. The purchaser presents the card to the merchant who either (1) consults the latest list of unauthorized cards, or, (2) phones the central clearance center. He processes the card in an embossing machine and hands copy to the purchaser. The merchant sends the copy to the card issuer. The card issuer discounts the face amount of the purchase and remits (within 15 to 45 days) the net amount to the merchant. The card issuer mails the bills to the purchaser who sends a check to the card issuer. The card issuer prepares a deposit ticket and presents the deposit ticket and check to the bank. The bank processes the deposit ticket and check. If the check is no good, the collection procedures previously mentioned must ensue.

SUMMARY OF THE INVENTION

In accordance with an important aspect of this invention, a much simpler system for transfer of funds is provided. In the system of this invention, the customer's purchases, or other debits against his account, are transmitted as messages to the computer center where they are debited against his account. The transaction is recorded and the record is subsequently forwarded to subscribers, some of which are the banks where the customer maintains his account.

The system of this invention is particularly suitable for the transfer of funds in completion of a retail sale but is also useful for other funds transfer transactions. For example, the system is used by a bank teller to inquire whether a customer's account is sufficient to cover a check presented for cash and to immediately debit this amount from the account.

In accordance with another important aspect of this invention the funds transfer system includes a verifier unit at each input output terminal. The verifier has a keyboard by which the customer can enter an identifying code known only to the customer. This identifying code is compared with a machine sensible identifying code on the customer's identification card to provide positive verification of the identification of the customer.

In accordance with another important aspect of this invention the identification card reader is in a separate unit from the verifier unit at each input output terminal. The separation of the two units allows the customer to enter the identifying code on the verifier unit without observance by the merchant. The two units are connected by a comparison channel which compares the code entered by the customer with the code on the identification card. In this manner the identification card remains in the card reader during the entire transaction of verification and transmission of the encoded identifying indicia to a central location. Because of the separation of the two units it is virtually impossible for an exchange of cards, either inadvertent or intentional, which would compromise the security which the card holder has against misuse of his card.

In accordance with another important aspect of this invention a printer at each input output terminal produces a hard copy receipt recording the transaction. This receipt provides visual evidence of the transaction and can be used to resolve later occurring questions about the transaction. It should be noted that these hard copy documents are used only as a rare exception The tracing of transactions from the hard copy is not a built-in routine requirement.

In accordance with another important aspect of this invention the customer's available balance is stored at the central location and is continuously updated during the day. At the end of the day a record of the transactions that updated the account are transferred to the customer's own bank, or to anoter subscriber to the service. These other subscribers may include credit bureaus, credit card distributors, large retail stores, or any other organization who wishes to maintain customers' accounts.

The foregoing and other objects, features and advantages of this invention will be better understood from the following more detailed description, appended claims and drawings.

DESCRIPTION OF A PARTICULAR EMBODIMENT

Table of Contents
 I. The Overall System, FIG. 1
 II. Description of the Hardware of a Particular Embodiment
   A. The Block Diagram, FIG. 2
   B. The Specific Components of the System
 III. The Programming Of the Digital Computer at the Central Location
   A. The Merchant's File
   B. Merchant Transactions
 IV. The Arrangement of the Equipment at the Point of Sale, FIG. 3
 V. Operation of the System
   A. Transmit
   B. Receive I. The Overall System, FIG. 1

Figure 1:
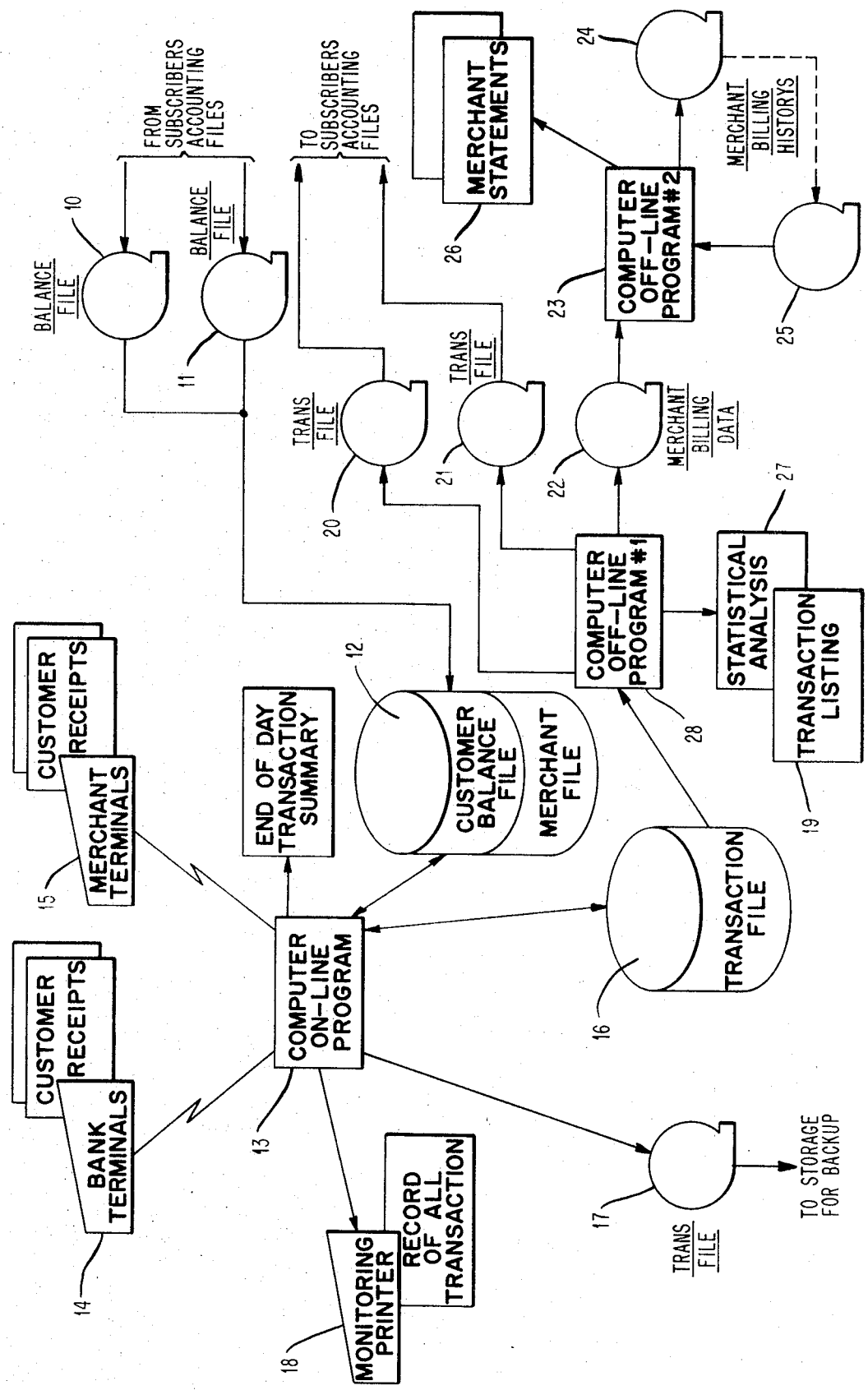
FIG. 1 shows a flow diagram of the operation of the system.

In FIG. 1 the inputs to the central location processing center include customer's balance files, two such magnetic tape files 10 and 11 being shown. These files are periodically updated by subscribers to the system. As an example, a subscriber, for example the customer's bank or the customer's credit card company, will update the customer's account daily. The bank may update the customer's checking account during the night. Transactions are posted. A new figure is arrived at for the demand deposit balance and a new figure is arrived at for the available overdraft line of credit. The sum of the demand deposit balance and the available overdraft line of credit is the customer's available balance. Commonly, in the morning a program is run at the customer's bank which strips off the account number and the available balance from the data processing records. This account number and the available balance are recorded on the magnetic tape balance file.

These new balance files are then transported to the central location. The records on the various subscribers' balance files are transferred to the magnetic disc 12. The magnetic disc 12 provides means for storing the available balance which can be drawn against each customer's account. The system is now ready to begin operating on-line through the computer 13.

The system includes a plurality of input-output terminals, the terminals 14 and 15 being shown in FIG. 1. The terminal 14 is indicated to be a bank terminal, for example at a teller's cage. At this terminal the customer can present his identification card which will be used in the input-output terminal to automatically transmit encoded identifying indicia to the computer 13. The input-output terminal also has a keyboard for encoding the amount of money to be transferred. The amount is debited against the customer's available balance and an indication is sent back to the terminal 14 that the transfer of money to the customer can be completed.

Alternatively, the terminal 15 is indicated to be an input output terminal at a retail merchant's point of sale. In completion of a retail sale, the customer's identification card is processed by the terminal to transmit identifying indicia to the computer 13. The amount of sale is also transmitted to the computer 13 where it is debited from the customer's available balance.

Each time a customer uses his identification card the available balance on the disc 12 is interrogated and updated.

The magnetic disc 12 also provides means for accumulating credit for the merchant's accounts. Each merchant's file is started at zero at the beginning of the day. Credit is added during the day as the various retail transactions are completed.

Each transaction which is completed with one of the remote terminals is posted to a transaction file on the disc 16. This is a complete listing of all transactions. As a security precaution, all transactions are also posted to a backup stage 17. This is placed in storage in case the transaction file on the disc 16 is lost or destroyed.

Concurrently with the completion of the transactions, the printer 18 prints out all exceptional transactions. For example, if a person uses his identification card more than a specific number of times on one day, there will be a printout of this exception transaction on the monitor printer 18. The printer 18 prints out an "audit trail" of the exceptional transactions.

Before going off-line at the end of the day, the transaction file on the disc 16 is processed by the off-line computer program indicated at 18 to print out a complete summary of the day's transactions. This summary, indicated at 19, provides a complete audit trail of all transactions completed during the day.

At the end of the day the computer off-line program indicated at 18 breaks down the transaction file by subscribers. A transaction file is written out for each subscriber. Two transaction files are indicated at 20 and 21 but there will be a transaction file for each subscriber. Each bank, credit card company, department store or other subscribers who maintain customers' accounts will receive a transaction file recording all transactions involving their customers' accounts. These transaction files, including files 20 and 21, are physically carried to the subscribers where they are processed. For example, during the night the transaction file may be processed by a bank's data processing equipment to post transactions and update customers's checking accounts. A new amount for the customer's demand deposit and available overdraft line of credit is obtained. Then, the next day the customer's account number and available credit balance can again be stripped off and placed on the subscriber's balance files as previously discussed with reference to the files 10 and 11.

It is an important feature of this invention that the subscribers can use existing, and varying types of data processing. The system of this invention is compatible with the various types of data processing presently in use by various banks and credit card companies because it is only necessary that these data processing systems be capable of accepting a transaction file from the system, and making up a new balance file by merely stripping off the customer's account number and available credit balance. Note that the subscribers may accept transactions from other systems. It is only necessary that the transactions from the fund transferral system of this invention be given priority of posting to insure that the customer's account is never overdrawn by this system.

Certain statistical and housekeeping functions are indicated in FIG. 1. The merchant pays for his participation in the system on the basis of the merchant's activities. As indicated at 22 the activity of each merchant is recorded on a billing file. The billing file is sent once a month to the off-line program indicated at 23. The merchant's previous billing history file 24 is updated to produce an updated billing history 25. Alternatively, the merchant's statement 26 is prepared and the billing history 24 is wiped clean.

The off-line program indicated at 18 also generates a statistical analysis 27 which indicates for example the volume of transactions on each of the terminals. This provides marketing information to indicate, for example, which retail establishment generates the most volume and should therefore be solicited for business. The statistical analysis 27 also indicates the time and volume of transactions. This usage analysis is important in determining the time periods at which the most lines servicing the computer are required, for example.

II. Description of the Hardware of a Particular Embodiment

A. The Block Diagram, FIG. 2

Figure 2:
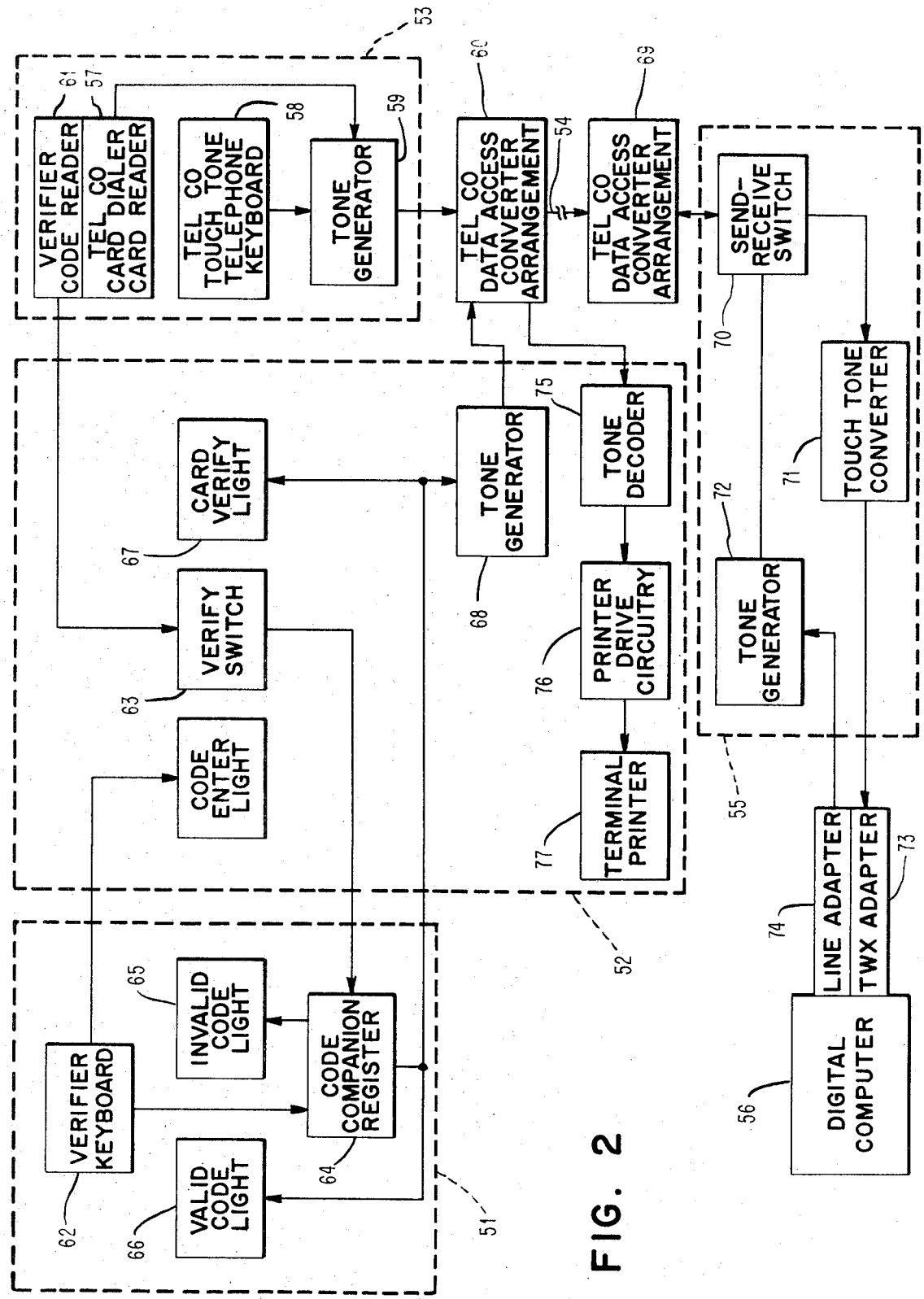
FIG. 2 shows a block diagram of one input output terminal and the central location.

The hardware used in a system for transferring funds between customers' accounts and a merchant's account is shown in FIG. 2. As previously discussed, this hardware represents generally the hardware used in the system. For example, the equipment shown in FIG. 2 at the merchant's point of sale will be the same as the equipment provided at the bank teller cage where the system is used to transfer funds from the customer's bank account to the customer in cash.

The apparatus at the merchant's point of sale includes the code verifier 51, and output unit 52 and an input unit 53. The input unit 53 includes a card reader and a keyboard which encodes the identifying indicia on the customer's credit card, the identifying indicia on the merchant's card and the amount of sale.

A communication link 54 transmits the encoded identifying indicia and amount of sale from each input unit to a central location. The central location includes the communication interface adapter 55 and the digital computer 56.

The particular system which will be described is one in which the communication link 54 is a standard switched network telephone line. The input unit 53 includes the card-dialer, card reader 57 for encoding the identifying indicia on the customer's identification card, for dialing the number which will establish communication with the central computer, and for encoding the merchant's identifying number. A standard type keyboard 58 is provided to encode the amount of sale and other inputs. The card dialer card reader 57 and the keyboard 58 operate the tone generator 59. Touch tone signals are applied through the data access converter 60 to the communication link 54.

The input unit 53 also includes a verifier code reader 61 for sensing the invisible identifying code on the customer's identification card. The same code is entered by the customer on the verifier keyboard 62 in the verifier unit 51. The machine sensible identifying code on the customer's identification card is compared with the identifying code entered by the customer on the keyboard 62. When a verifier button on the terminal unit 52 is depressed, the identifying code from the code reader 61 is applied through the verify switch 63 to the code comparison register 64. This effects a comparison between the identifying code on the customer's identification card and the identifying code entered by the customer at the keyboard 62. If the two codes are not identical, an invalid code light 65 is lit. If the two codes are identical, a valid code light 66 and a card verified light 67 are lit. Also, the tone generator 68 is enabled to apply a 50 millisecond tone to the data access converter 60 which in turn sends the tone over the communication link 54 to the computer.

At the central location end of the communication link 54, a data access converter 69 applies received touch-tone signals to the adapter 55. The adapter 55 includes a send-receive switch 70, a converter 71 and a tone generator 72. The converter 71 converts received touch tone signals to codes which can be operated upon by the digital computer 56. In the specific embodiment being described the tones, are converted to ASCII. Alternatively, EBDIC or other standard business codes suitable for processing can be used. Received signals are applied through the TWX adapter 73 to the digital computer 56. The comouter 56 responds by applying the appropriate response through the line adapter 74 to the tone generator 72. The touch tone message is transmitted through send-receive switch 70, data access converters 69 and 60, to a tone decoder 75. This enables printer drive circuitry 76 to print out the response.

B. The Specific Components of the System

As previously mentioned, the particular embodiment being described is one used with half-duplex switch network telephone lines. Of course, the communication link may be by other means, and the components used in the system may take many forms. However, the following components were used in one actual embodiment of the invention and are given by way of example.

1. The verifier unit 51. Sold under the trade name Vericard by Vericard, Incorporated and described in their brochure entitled 2. The Output Unit 52. A commercially available unit manufactured by Electrospace Corporation, 12 Morris Avenue, Glencove, New York 11542 under their trade name Insta-Tran Model DPR-100.

3. The Input Unit 53. Bell Telephone system card dialer telephone set with touch tone dialing. The card reader 57 is modified to sense invisible identifying codes on the credit card. While many credit cards with invisible identifying codes are now in commercial use, the one particularly suitable and the one used in the actual system is available from the Vericard, Inc.

4. Data access converters 60 and 69. Standard Tel. Co. Data Access Arrangement.

5. Digital computer 56. A Burroughs B-3501 computer with a Burroughs multiline control.

6. TWX adapter 73 and line adapter 74. A Burroughs 33/35 TWX adapter, model B-3652-1.

7. The Computer Communications Interface Adapter 55. This is specially built equipment. This adapter, hereinafter referred to as CIA, has the following specifications which will enable the production of a comparable adapter. This adapter will interface with a standard voice grade telephone line and various types of data processing hardware. Its purpose is to provide a means whereby tone signalling input can be converted into ASCII, EBDIC, or other standard business code suitable for processing; and to convert ASCII, EBDIC, or other standard business code into a tone signalling format suitable for transmission over voice grade telephone lines. The following specifications are applicable:

TABLE I

EIA Standard RS-232-B, October 1965
DATA SET 4030, 403E A.T.T. Spec. November 1967
DATA SET 401A, 401E A.T.T. Spec. November 1966 March 1967
DATA ACCESS ARRANGEMENT A.T.T. Spec. November 1968

1.0 General

The CIA is a data receiver and a data transmitter which is intended to be used in a half duplex mode over the switched telephone network in conjunction with the Bell System "Data Access Arrangement" for electrical connection to a telephone line. The data receiver portion of the CIA accepts dual-frequency (touch tone) signals from the telephone line and converts them to serial output ASCII start-stop characters for application to the computer.

The data transmitter portion of the CIA accepts serial input ASCII start-stop characters from the computer, and converts each character to dual-frequency (touch tone) signals for transmission over the telephone line and through the switched network.

Control over the half-duplex operation (i.e. either receive or transmit) is via a control lead to this unit from the computer.

2.0 System Description 2.1 Data Receiver

The data receiver portion of the CIA will accept two out of eight dual-frequency (touch tone) signals from the telephone line and convert these signals to serial, start-stop 11 bit ASCII coded characters for transmission to the computer. The receiving rate is ten characters per second. The frequency plan of the dual-frequency (touch) tones is shown in Table II.

TABLE II

|  |  | $B_1$ 1209 HZ | $B_2$ 1336 | $B_3$ 1477 | $B_4$ 1633 |
|---|---|---|---|---|---|
| A1 | 697HZ | 1 | 2 | 3 | SOM |
| A2 | 770 | 4 | 5 | 6 | NL |
| A3 | 852 | 7 | 8 | 9 | — |
| A4 | 941 | 0 | 0 | $ | SP |

The code translation table which relates the two out of eight code and the ASCII code is shown in Table III.

TABLE III

| Character | 2 out of 8 CODE | | Start | LEAST SIGNAL BIT ASCII CODE | | | | | | |
|---|---|---|---|---|---|---|---|---|---|---|
|  |  |  |  | $D_1$ | $D_2$ | $D_3$ | $D_4$ | $D_5$ | $D_6$ | $D_7$ |
| 0 | $A_4$ | $B_2$ |   | 0 | 0 | 0 | 0 | 1 | 1 | 0 |
| 1 | $A_1$ | $B_1$ | 1 | 0 | 0 | 0 | 1 | 1 | 0 |  |
| 2 | $A_1$ | $B_2$ | 0 | 1 | 0 | 0 | 1 | 1 | 0 |  |
| 3 | $A_1$ | $B_3$ | 1 | 1 | 0 | 0 | 1 | 1 | 0 |  |
| 4 | $A_2$ | $B_1$ | 0 | 0 | 1 | 0 | 1 | 1 | 0 |  |
| 5 | $A_2$ | $B_2$ | 1 | 0 | 1 | 0 | 1 | 1 | 0 |  |
| 6 | $A_2$ | $B_3$ | 0 | 1 | 1 | 0 | 1 | 1 | 0 |  |
| 7 | $A_3$ | $B_1$ | 1 | 1 | 1 | 0 | 1 | 1 | 0 |  |
| 8 | $A_3$ | $B_2$ | 0 | 0 | 0 | 1 | 1 | 1 | 0 |  |
| 9 | $A_3$ | $B_3$ | 1 | 0 | 0 | 1 | 1 | 1 | 0 |  |
| SOM | $A_1$ | $B_4$ | 0 | 1 | 1 | 1 | 0 | 1 | 0 |  |
| — | $A_3$ | $B_4$ | 1 | 0 | 1 | 1 | 0 | 1 | 0 |  |
| SPACE | $A_4$ | $B_4$ | 0 | 0 | 0 | 0 | 0 | 1 | 0 |  |
| $ | $A_4$ | $B_3$ | 0 | 0 | 1 | 0 | 0 | 1 | 0 |  |
| EOM | $A_4$ | $B_1$ | 0 | 1 | 0 | 1 | 0 | 1 | 0 |  |
| NL | $A_2$ | $B_4$ | — | — | — | — | 0 | 1 | 0 |  |

2.0 System Description (continued)

2.2 Data Transmitter

The data transmitter portion of the CIA will accept serial input, start-stop, 11 bit ASCII coded characters and convert them to two out of eight dual-frequency (touch-tone) signal for transmission over the telephone line. The transmission rate is 10 characters per second, and the bit rate for each character is 110 bits/second. The transmitter will translate any of the 16 ASCII characters indicated in Table III. Provision is made in the transmitter for 10 frequencies, divided into two groups of five frequencies each. ($A_0$ through $A_4$, and $B_0$ through $B_4$). One frequency in each of the two groups is used as a "rest" frequency for echo suppression. The rest frequencies are $A_0 = 600$ HZ and $B_0 = 1,098$ HZ. The transmitter will have the capability for generating 25 characters, by using one frequency from each of the two groups.

3.0 Interface Description

Figure 4:
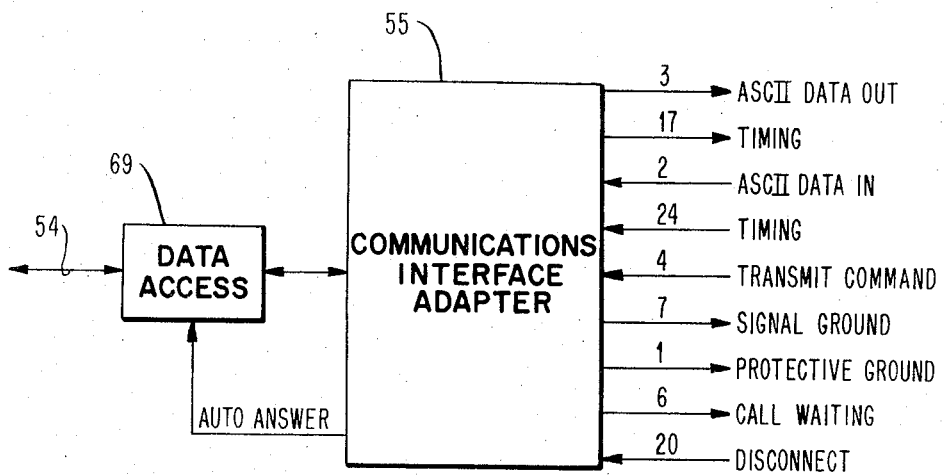
FIG. 4 depicts the interface at the computer.

An interface diagram is shown in FIG. 4.

3.1 Interface Levels

All circuit leads between the customer's equipment and the CIA conform to the EIA RS-232-B Interface Standard. On Data leads, −3 volts represents marking (one) condition, and +3 volts represents a spacing (zero) condition.

On control leads, −3 volts represents the OFF condition, and +3 volts represents the ON condition.

3.2 Description of Interface Signals 3.2.1 Protective Ground, Lead 1: This conductor is electrically bonded to the frame of the CIA. It is also connected to the external ground through the AC power cord.

3.2.2 Signal Ground, Lead 7: This conductor establishes the common ground reference for the data and control signal voltage.

3.2.3 Transmit Command, Lead 5: From the adapter to the CIA. This control lead is used by the adapter for automatically switching the CIA to the transmit mode. When in the transmit, the data transmitter is connected to the telephone line and the data receiver is disconnected from the telephone line.

Upon activation of the transmit command to the ON state, switchover from receive to transmit will occur in less than 10 milliseconds.

However, the transmit command must be maintained for at least 10 milliseconds before data can be transmitted from the adapter to the CIA.

3.2.4 Call Waiting, Lead 6: From the CIA to the adapter. The present data access arrangement provides only for manual hook-switch supervision of calls.

When the CIA is equipped for automatic on-off hook supervision, ringing will be detected by this unit and the subset in the data access arrangement will automatically be switched to the data mode. The call waiting signal will be used only when this unit is equipped to operate in the automatic mode. An ON state on this lead indicates to the adapter that a call is either waiting or being processed by the adapter.

3.2.5 Disconnect, Lead 20: From the adapter to the CIA. This signal will be used only when the CIA is equipped to operate in the automatic mode.

The purpose of the disconnect signal is analogous to going back on-hook after a call is terminated.

Activation of this lead to the OFF state for a period of at least 50 milliseconds will cause the connection through the switched telephone network to be automatically dropped, so that the CIA may now accept new incoming calls.

3.2.6 ASCII Data Out, Lead 3: From the CIA to adapter. This lead will remain in the marking (one) state when no characters are being sent to the customer's adapter. The bit rate for each ASCII character sent to the adapter is 110 bits/second, and the data format for each bit of the ASCII character will be NRZ.

3.2.7 Timing Clock Out, Lead 17: From the CIA to adapter. The CIA will deliver timing pulses over this conductor which can be used by the adapter to sample (strobe) the bits of the serial ASCII output characters transmitted on lead 3.

These timing pulses will be such that a positive transition of the timing pulse occurs in the middle of each NRZ data bit, and at a bit rate of 110 pulses/second.

3.2.8 ASCII Data In, Lead 2: From adapter to the CIA. This lead will remain in the marking (one) state when no characters are being received from the adapter. The bit rate for each character received from the adapter is 110 bits/second, and the data format for each bit of the ASCII character will be NRZ.

3.2.9 Timing In Clock, Lead 24: From adapter to the CIA. The timing pulses from the adapter are optional since the CIA has an internal clock. However, for more reliability and better performance, use of the adapter timing clock is recommended.

The adapter will deliver timing pulses over this conductor which can be used by the CIA to sample (strobe) the bits of the serial ASCII input characters sent from the adapter. These timing pulses will be such that a positive transition of the timing pulse occurs in the middle of each NRZ data bit, and at a bit rate of 110 bits/second.

III. The Programming of the Digital Computer at the Central Location

The following description of the functions performed and the codes used in the transaction system will enable a programmer to generate the programs necessary for use in the digital computer 56.

A. The Merchant's File

Each merchant has a unique account number. The merchant's file is initialized every day at the start of the day's operation. In the particular embodiment being described the merchant's file is contained on a deck of cards.

1. each card of the basic merchant file contains:
   a. a unique number to be placed on the merchant's telephone dialer card.
   b. a DDA bank account number of merchant
   c. a maximum value of liability extended to merchant
   d. a branch number
   e. an amount of discount, if any, to be given to customer using the system.

This deck of cards is read into the computer and an expanded merchant file is created within the computer memory.

The merchant file in the computer contains the following fields:
   a. merchant number composed of a merchant number plus a clerk number
   b. merchant DDA bank account number
   c. maximum dollar value of liability extended to merchant
   d. branch number
   e. amount of discount to be given customers who use the system
   f. number of cash sales today
   g. dollar value of cash sales today
   h. number of cash withdrawals today
   i. dollar value of cash withdrawals today
   j. number of transactions (cash sales) where merchant assumes liability (either due to insufficient funds or secret code or both)
   k. dollar value of potential liability due to transactions indicated in (j)
   l. number of transactions (cash withdrawals) where merchant assumes liability (either due to insufficient funds or secret code or both)
   m. dollar value of potential liability due to transactions indicated in (1)
   n. number of returns or corrections to cash sale transactions
   o. dollar value of transactions in (n)

p. number of corrections to cash withdrawal transactions
q. dollar value of corrections to cash withdrawal transactions
r. number of cash sales involving discounts
s. dollar value of discount given to customers
t. filler

B. MERCHANT TRANSACTIONS

The following transactions are programmed into the merchant system.

1. Cash Sale or Purchase

The customer makes a purchase at a local merchant through the system. He uses the secret code feature of the system.

The customer's on-line field is altered by this transaction. The number of Instant Debit Transactions is increased by one. The dollar value of the purchase is added to the dollar value of his instant debits today.

A check is made to see if he has insufficient funds for the transactions. A test is made to determine the activity of this account during this 24-hour period.

The merchant's on-line file is altered by this transaction. The number of cash sales today is increased by one. The dollar Value of cash sales today is increased by the amount of the transaction.

1.1 Input Message Parameters
Merchant number
Secret Code Symbol
Customer account number
Transaction number
Locator character
Total dollar amount of transaction
End of message character 2. Correction to a Purchase or a Return of Merchandise The merchant made a mistake on a previous cash sale transaction and must undue the error before making the normal cash sale type of transaction.

The customer is returning previously purchased merchandise for credit or exchange.

In either of the above cases the program handles the merchant and customer files in an identical manner.

The merchant file is altered. The number of returns and/or corrections today is increased by one. The dollar value of the transaction is added to the dollar value of returns and/or corrections to purchases today.

2.1 Input Message Parameters
Merchant number
Customer account number
Transaction number
Locator character
Total dollar amount of transaction
End of message symbol 3. Cash Withdrawal A customer goes to a local merchant and obtains cash from the merchant. The secret code feature is used.

The customer and merchant on-line files are altered by this transaction.

The customer's on-line file will have the number of debits today increased by one. The dollar value of his instant debits today will be increased by the amount of the transaction. A check is made to see if he has insufficient funds for the transaction. Also, a test is made to determine the activity of this account within a 24-hour period.

The merchant's on-line file will have the number of cash withdrawal transactions today increased by one. The dollar value of cash withdrawal today will also be increased by the amount of the transaction.

3.1 Input Message Parameters
Merchant number
Secret code symbol
Customer account number
Transaction number
Locator character
Total dollar amount
End of message symbol 4. Correction to a Cash Withdrawl The merchant made a mistake in performing a cash withdrawal and must correct the error before entering the correct cash withdrawal transaction.

The merchant and the customer files are altered by this transaction.

The customer's on-line file has the number of instant credit today increased by one. The dollar value of instant credits today is increased by the amount of this transaction.

The merchant's on-line file has the number of corrections to cash withdrawals increased by one. The dollar value of correction to cash withdrawals is increased by the amount of the transaction.

4.1 Input Message Parameters
Merchant number
Customer account number
Transaction code number
Locator character
Total dollar amount
End of message symbol 5. Cash Purchase With Discount The customer makes a purchase at a local merchant. The customer receives a discount from the purchase price.

The customer file is altered such that the number of instant debits is increased by one. The dollar value of instant debits is increased by the amount of the transaction.

The merchant file is altered such that the number of cash sales is increased by one. The dollar value of cash sales is increased by the amount of the transaction (purchase price less discount). The dollar value of discounts given to customers is increased by the amount of the discount given in this transaction. The number of sales on which discount was given is increased by one.

A test is made to ascertain that the customer has sufficient funds. A test is also made to determine the activity of the customer account within the last 24 hours.

5.1 Input Message Parameters
Merchant number
Secret code symbol
Customer account number
Transaction number
Locator character
Total dollar amount of sale
End of message symbol Example: For a $10.00 sale with a 2 percent discount, the merchant's total amount of sale is $10.00 and sales tax (5 percent) for a total amount of $10.50 which is entered on the keyboard. The computer discounts 2 percent and prints out a receipt for $10.29. This $10.29 is debited to customer, credited to merchant. In addition, $.21 is credited to amount of discount given to customer by merchant.

In order to correct a purchase with discount transaction, the same procedure is followed as to correct a cash sale.

6. Merchant Query — 1

This enables the merchant to obtain totals about his daily activities. The merchant file is not altered by the query.

The following information is available to the merchant:

a. Net Merchant Balance equals:
  —dollar value of sales today and dollar value of cash withdrawals today.
  —dollar value of corrections and/or returns.
  —dollar value of correction to cash withdrawals.
b. Number of sales in which a discount was given.
c. Dollar amount of discount given.
d. Number of sales in which merchant assumed liability (due to cash sales and cash withdrawals)
e. Dollar value of liability (cash sales and cash withdrawals)
f. Month and day.

6.1 Input Message Parameters
Merchant number
Transaction number
Locator character
End of message symbol 7. Merchant Query — 2

This transaction enables a merchant to obtain additional information regarding his daily business activity. The merchant file is not altered by this transaction.

The following information is available:
a. Number of cash sales today.
b. Dollar value of cash sales today.
c. Number of cash withdrawals today.
d. Net amount of cash withdrawals (Cash withdrawals-Corrections)
e. Number of returns or corrections to cash sales.
f. Dollar value of returns or corrections to cash sales.

8. Merchant Test Message

This enables a merchant to request the computer to transmit a test message to his terminal. This will verify that the terminal is operational. The merchant file is not altered by this transaction.

8.1 Input Message Parameters
Merchant number
Transaction number
Locator character
End of message symbol Before the program goes off line, it will scan the merchant file.

There will be a print out for each terminal with the following information:
  —merchant number
  —total number of sales where merchant assumed liability (cash sales and cash withdrawals)
  —total dollar amount of liability (due to sales) incurred by merchant during this 24-hour period.

The customer's on-line file is altered such that the number of instant debits today is increased by one. The dollar value of debits today is increased by the amount of the transaction.

IV. The Arrangement of the Equipment at the Point of Sale

Figure 3:
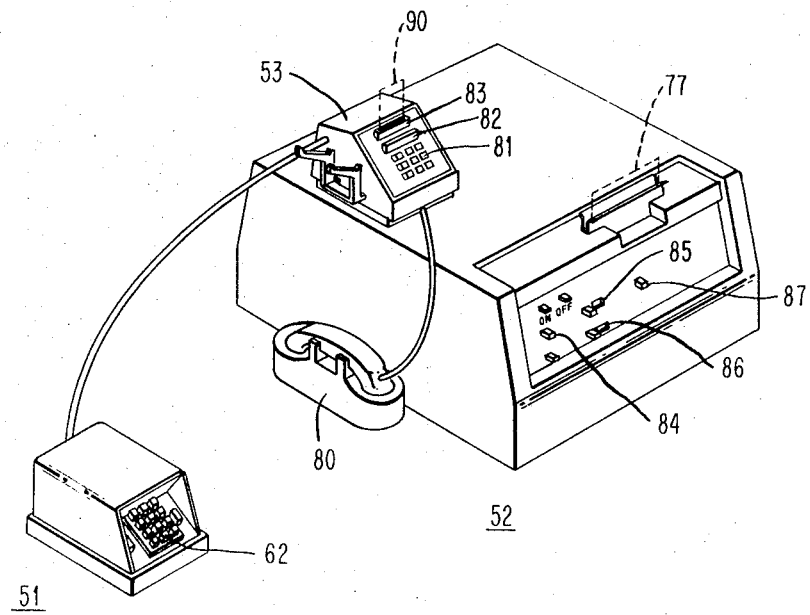
FIG. 3 shows the mechanical arrangement of the equipment at the input output terminal.

FIG. 3 shows the verifier unit 51, the output unit 52 and the input unit 53. The equipment at the input output terminal also includes the telephone 80, the standard touch tone keyboard 81, the dial start bar 82 and a slot 83 for receiving coded cards.

The output unit 52 includes a start button 84, the code enter light 85, and a card verify light 86. A verify switch button 87 is depressed when it is desired to compare the invisible identifying code on the customer's card with the number entered by the customer on the keyboard 62 of the verifier unit 51. At the point of sale the merchant inserts his merchant dialer card 90 into the slot 83. After the computer is automatically dialed the merchant inserts the customer's identification card into the slot 83. The identification card is a laminated plastic card having an aluminum strip embedded in the plastic. A three or more digit code is impressed on the aluminum strip. This code is machine sensible, but it is invisible to the human eye.

The identification card is also punched with a visible machine readable code identifying the customer. Commonly, this will be a 14-digit code including the standard ABA identification and routing number of the customer's bank plus the customer's Social Security number.

At this point note that the separation of the verifier unit 51 from the output unit 52 permits a high degree of security. Since the two units are separated the customer can enter his code number on the keyboard without observance. Since the means for sensing the invisible code on the identification card is in the input unit 53, there is no need to transfer the card, for example from the verifier unit to the input unit. Such transfer of cards during the transaction could compromise the security of the customer identification. In the present system the card remains in the input unit 53 during the entire transaction.

V. Operation of the System

The sequence of operations during the transaction is as follows. The merchant inserts his card in the slot 83. He picks up the hand set 80 which opens the telephone link. The dial start bar 82 on the card dialer is depressed. This causes the merchant's ID card 90 to "read out" the telephone number of the computer at the central location. The reading of the card stops after dialing the computer. When the computer answers, it sends an "answer back" tone which is audible to the operator through the telephone 80. Upon receipt of the "answer back" tone, the dial start bar 82 is depressed again. This releases the merchant's ID card 90 and causes the merchant's identification number on that card to be transmitted to the computer. The customer enters his multi-digit code on the keyboard 62 of the verifier unit 51. This causes the code enter light 85 on the output unit to be lit.

The merchant removes his card (90) and inserts customer's identification card. Then, the merchant depresses the verify switch button 87. Then the dial start bar 82 is depressed. The customer's card is released. The secret identification code is sensed. If the code on the card is the same as the code that the customer has punched the valid code light 66 on the verifier unit 51 and the card light 67 on the output unit will be lit. Concurrently a 50 millisecond tone is sent to the computer. If verification does not take place an invalid code light 65 is turned on and no tone is sent to the computer.

The customer's identification continues to travel the rest of the way out of the slot thereby transmitting the customer's account number to the computer.

The merchant then keys in the following data on the telephone keyboard 81. A transaction code of two digits, a number sign of one digit, the money amount of variable digits and an asterisk, one digit signifying the end of the message. After receiving the end of message from the terminal, the computer processes the message and transmits a reply message to the printer. The two-digit transaction code may indicate a cash sale, cash withdrawal, correction to a cash sale, or credit card line of credit transaction, for example. After receiving the end of message from the terminal, the computer processes the message and transmits a reply message to the printer 77. This printed message will depend upon the type of transaction, and whether the customer's available balance exceeds the entered amount of sale. A typical reply printed on the printer 77 in response to a request for a cash sale is as follows.

—02110 073227357 094325859 00 $25.67*

The first two hyphens indicate a valid message. The first five digits 02110 indicate the date of Feb. 11, 1970. The next nine digits are the customer's account number. The next nine digits are the merchant's identification number, the next two digits are the transaction code, in this case indicating a cash transaction. The dollar sign signifies that what follows is the amount of sale. The amount of sale in this case is $25.67 which is followed by an asterisk which is the end of the message. This message is printed on a sales slip which is given to the customer to provide him with hard copy evidence of the sale. This can later be compared with his bank statement which will contain a similar notation.

The following summarizes the sequence of events at the point of sale.

A. Transmit
1. Merchant calls the computer. Either manual or card dial.
2. Computer answers back.
3. Merchant transmits his code number.
4. Customer's code is verified.
5. Customer's account number is transmitted.
6. The transaction code is sent.
7. A # sign is sent.
8. The amount of the purchase is transmitted.
9. The final digit sent will be an * (Signifying end of message.)

B. Receive
1. To unlock the circuits in the DPR-100 a (period) is sent. (Signifying start of message.)
2. The message transmitted by the computer is printed.
3. At the end of each message an * will be sent which shuts off the printer.

The following summarizes the operation of the computer in response to an input request. The computer is programmed to locate the # sign. The program looks for the secret code identification transmitted as the 50 millisecond tone. If it is present then the validity of the bank number is verified. The validity of the merchant's number is verified.

The program finds the transaction code. This specifies the section of the program which is followed next. In a normal cash sale the program credits the merchant's account and debits the customer's account. The dollar amount of the cash sale is compared to the balance in the customer's account. If there is sufficient balance the computer transmits a message beginning with two hyphens indicating there is no error. The remainder of the message is then transmitted to the remote terminal and printed as previously described. If the customer's account is insufficient, the computer outputs an error signal plus the amount of the sale.

From the foregoing description, many modifications and improvements within the scope of this invention will be apparent. For example, the entire transaction could be completed with an embossed type credit card instead of the telephone dialer card described. A leased line could be used instead of a switched network line. The reply message could be a multiple line reply instead of a single line reply. These and other modifications are within the scope of the invention and are intended to be covered by the following claims.

What is claimed is:

1. A system for transferring funds between customers' accounts and retail merchants' accounts comprising:
   an identification card for each of a plurality of customers, each card having machine sensible identifying indicia,
   input terminals at the points of sale of the retail merchants for encoding the identification of the retail merchant, the identifying indicia of the customer making a transaction and the amount to be transferred,
   means at a central location for storing the customer's available balance which can be drawn against the accounts of a plurality of customers,
   means at said central location for storing retail merchants' accumulated credit for the accounts of a plurality of said retail merchants,
   a communication link connected to said input terminals and connected to said central location for transmitting the encoded identifying indicia and amount to be transferred from each input output terminal to said central location,
   a digital computer at said central location connected to said means at said central location for completing the transfer which simultaneously debits said amount against said customer's available balance and credits said amount to the identified retail merchant's accumulated credit, in response to transmission of said encoded identifying indicia and said amount to be transferred,
   means for applying to said communications link a signal signifying completion of transfer only if the customer's stored available balance exceeds the amount to be transferred and for applying a signal indicating no transfer if the amount exceeds the customer's available balance, and
   a printer at each point of sale connected to an input terminal at that point of sale and producing a hard copy receipt recording the transaction in response to the receipt of said signal signifying completion of transfer, said receipt providing visual evidence of the transfer for comparison with the customer's statement.

2. The system recited in claim 1, wherein the personal identifying indicia is encoded on each identification card as a machine sensible identifying code which is not visible to the human eye,
   said input terminal at the point of sale for entering the customer's personal identifying indicia comprising a vertifier unit including a keyboard by which the customer can enter his identifying code and, means for verifying including means for comparing the machine sensible identifying code on the customer's identification card with the identifying code entered by the customer at the keyboard to verify identification of the customer.

3. The system recited in claim 2 wherein each input terminal includes a card reader for sensing said machine sensible identifying indicia code, said card reader being a separate unit from the verifier unit at the same input output terminal, the separation of the two units allowing the customer to enter the code without observance by the merchant, said verifier unit and said card reader being connected by a comparison channel for comparing the code entered by the customer with the code on the identification card, the comparison channel between card reader and the verifier unit allowing the card to remain in the card reader during the entire transaction of verification and transmission of the encoded identifying indicia to said central location.

4. The system recited in claim 1 wherein each input output terminal includes a keyboard for encoding the amount to be transferred.

5. The system recited in claim 1 wherein said central location means includes a recording medium for recording the transfers from the customer's account so that said recording medium can be transferred to a subscriber at the end of the day for updating the customer's account as maintained by said subscriber.

6. The system recited in claim 5 wherein said subscriber is the customer's bank and wherein said recording medium is used for updating the customer's account as maintained by said bank.

7. A method of transferring funds between customers' accounts and retail merchants' accounts comprising:

sensing at input output terminals identifying indicia on customers' identification cards, encoding the identifying indicia and the amounts to be transferred, storing at a central location the available balance which can be drawn against each customer's account, accumulating credit for each retail merchant's account, transmitting the encoded identifying indicia and amounts to be transferred from each input output terminal to said central location, debiting the amounts to be transferred against the customer's available balance, crediting the amount to be transferred to the retail merchant's accumulated credit, and transmitting a signal signifying completion of transfer only if the customer's stored available balance exceeds the amount to be transferred and applying a signal indicating no transfer if the amount exceeds the customer's available balance.

8. The method recited in claim 7 further comprising:

entering an identifying code known only to the customer at an input output terminal, and comparing the entered identifying code with a machine sensible, invisible identification code on the customer's identification card to verify identification of the customer.

* * * * *

UNITED STATES PATENT OFFICE
CERTIFICATE OF CORRECTION

Patent No. 3,852,571      Dated December 3, 1974

Inventor(s) Bruce Wood Hall and Michael J. Shade

It is certified that error appears in the above-identified patent and that said Letters Patent are hereby corrected as shown below:

Column 1, line 22, "employee" should read --employer--;
Column 1, line 30, "counbs" should read --counts--.
Column 3, line 11, after "exception" there should be a period.
Column 4, line 44, "stage" should read --tape--.
Column 6, line 49, "comouter" should read --computer--.
Column 8, TABLE III should read:

LEAST SIGNAL BIT
ASCII CODE

| Character | 2 out of 8 CODE | | Start | $D_1$ | $D_2$ | $D_3$ | $D_4$ | $D_5$ | $D_6$ | $D_7$ |
|---|---|---|---|---|---|---|---|---|---|---|
| 0 | $A_4$ | $B_2$ | 0 | 0 | 0 | 0 | 1 | 1 | 0 |
| 1 | $A_1$ | $B_1$ | 1 | 0 | 0 | 0 | 1 | 1 | 0 |
| 2 | $A_1$ | $B_2$ | 0 | 1 | 0 | 0 | 1 | 1 | 0 |
| 3 | $A_1$ | $B_3$ | 1 | 1 | 0 | 0 | 1 | 1 | 0 |
| 4 | $A_2$ | $B_1$ | 0 | 0 | 1 | 0 | 1 | 1 | 0 |
| 5 | $A_2$ | $B_2$ | 1 | 0 | 1 | 0 | 1 | 1 | 0 |
| 6 | $A_2$ | $B_3$ | 0 | 1 | 1 | 0 | 1 | 1 | 0 |
| 7 | $A_3$ | $B_1$ | 1 | 1 | 1 | 0 | 1 | 1 | 0 |
| 8 | $A_3$ | $B_2$ | 0 | 0 | 0 | 1 | 1 | 1 | 0 |
| 9 | $A_3$ | $B_3$ | 1 | 0 | 0 | 1 | 1 | 1 | 0 |
| SOM | $A_1$ | $B_4$ | 0 | 1 | 1 | 1 | 0 | 1 | 0 |
| - | $A_3$ | $B_4$ | 1 | 0 | 1 | 1 | 0 | 1 | 0 |
| SPACE | $A_4$ | $B_4$ | 0 | 0 | 0 | 0 | 0 | 1 | 0 |
| $ | $A_4$ | $B_3$ | 0 | 0 | 1 | 0 | 0 | 1 | 0 |
| EOM | $A_4$ | $B_1$ | 0 | 1 | 0 | 1 | 0 | 1 | 0 |
| NL | $A_2$ | $B_4$ | - | - | - | - | 0 | 1 | 0 |

Column 11, line 24, "Value" should read --value--.

Signed and Sealed this sixth Day of April 1976

[SEAL]

Attest:

RUTH C. MASON
Attesting Officer

C. MARSHALL DANN
Commissioner of Patents and Trademarks